United States Patent
Warner et al.

(10) Patent No.: US 7,071,452 B2
(45) Date of Patent: Jul. 4, 2006

(54) SELF-CALIBRATING PHOTOELECTRIC CONTROL SYSTEM

(75) Inventors: Robert A. Warner, New Port Richey, FL (US); David L. Hanley, Clearwater, FL (US)

(73) Assignee: Tri-Tronics Company, Inc., Tampa, FL (US)

( * ) Notice: Subject to any disclaimer, the term of this patent is extended or adjusted under 35 U.S.C. 154(b) by 0 days.

(21) Appl. No.: 10/975,039

(22) Filed: Oct. 28, 2004

(65) Prior Publication Data

US 2006/0091285 A1    May 4, 2006

(51) Int. Cl.
*G01J 1/42*    (2006.01)

(52) U.S. Cl. ............... 250/205; 250/221.1; 250/223 R; 186/59

(58) Field of Classification Search ................ 250/205, 250/221, 222.1, 223 R, 223 B; 340/555–557; 186/59–61, 68, 69; 198/572, 444, 460.1
See application file for complete search history.

(56) References Cited

U.S. PATENT DOCUMENTS

| | | | |
|---|---|---|---|
| 4,236,604 A | * | 12/1980 | Warner ........................ 186/61 |
| 4,401,189 A | * | 8/1983 | Majewski ..................... 186/68 |
| 5,424,534 A | * | 6/1995 | Gordon et al. .......... 250/223 R |
| 5,609,223 A | * | 3/1997 | Iizaka et al. ................. 186/61 |
| 5,621,205 A | | 4/1997 | Warner et al. |
| 6,213,395 B1 | * | 4/2001 | Dejaeger et al. ............ 235/383 |
| 6,373,044 B1 | | 4/2002 | Seehawer |
| 6,950,778 B1 | | 9/2005 | Warner et al. |

* cited by examiner

*Primary Examiner*—Georgia Epps
*Assistant Examiner*—Davienne Monbleau
(74) *Attorney, Agent, or Firm*—McDermott Will & Emery LLP

(57) ABSTRACT

A self-calibrating photoelectric control system for use in a checkstand to control the starting and stopping of a conveyer belt utilized to move products closer to a checkout clerk. The self-calibrating photoelectric control system including a light source for emitting a light beam having an intensity, a photoelectric sensor for receiving light from the light source and for generating an output signal when the received light is equal to or greater than a light-state threshold of the photoelectric sensor; and a calibration circuit for automatically calibrating the sensitivity of the photoelectric control system to partial beam breaks after occurrence of any one of a plurality of predefined events. The calibration circuit is operative for performing a calibration process which adjusts the intensity of the light beam emitted by the light source such that the intensity is slightly greater than the light-state threshold of the photoelectric sensor. By repeatedly performing the calibration process at selected times, the present invention optimizes the detection of objects that partially block the light beam, and thereby greatly enhances the system's ability to detect translucent and low-profile products.

25 Claims, 6 Drawing Sheets

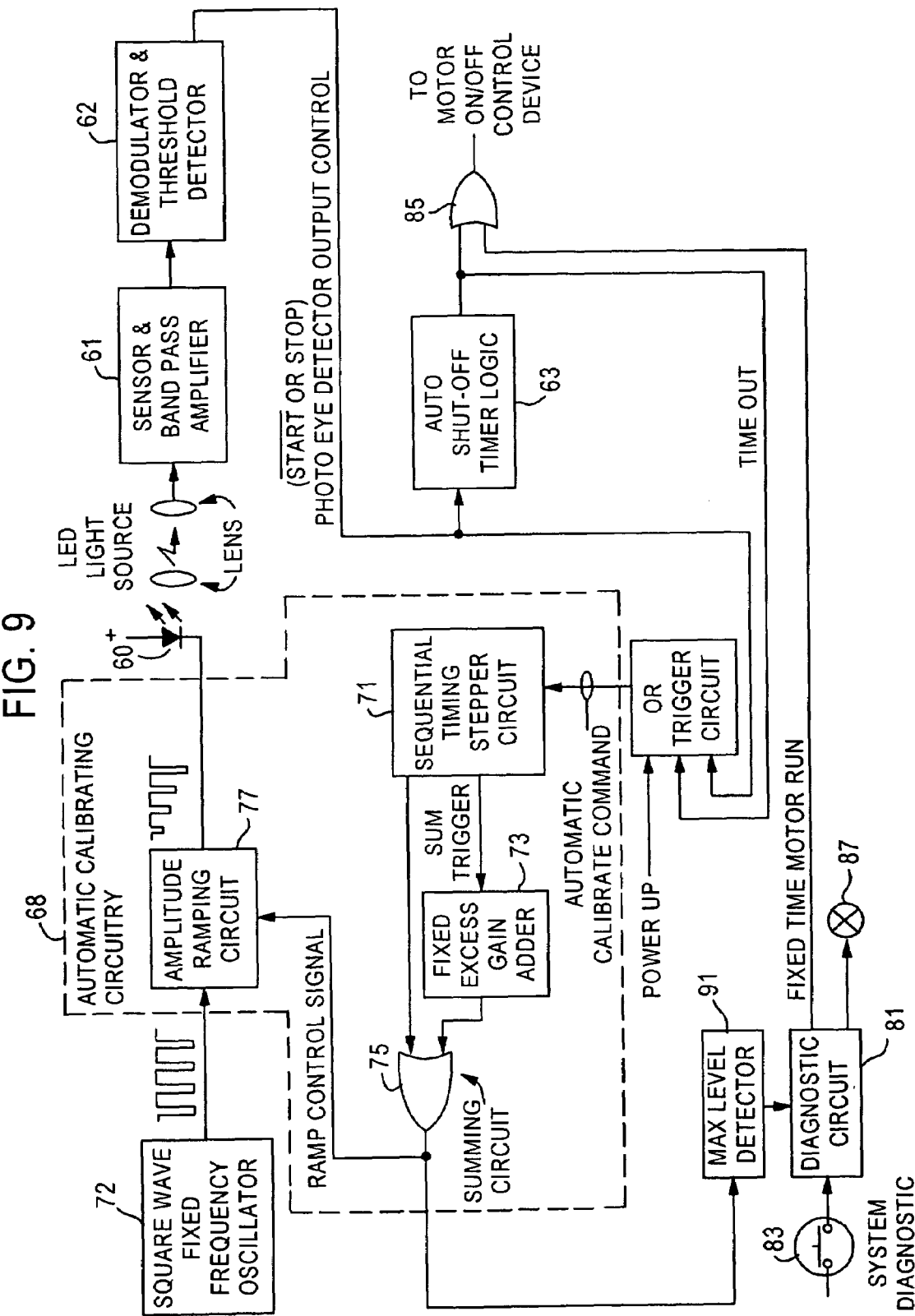

SELF-CALIBRATING PHOTOELECTRIC CONTROL SYSTEM

FIELD OF THE INVENTION

This present invention relates to a photoelectric control system for use in material handling systems. In particular, the present invention relates to a self-calibrating photoelectric control system for providing start/stop control of a conveyer belt in automated checkout systems utilized in retail stores.

BACKGROUND OF THE INVENTION

The use of automated control systems for controlling the stopping and starting of conveyers, such as those utilized in retail stores, is well known. Typically, such systems are provided at the delivery end of a conveyor belt built into the checkout stand (also referred to herein as a checkstand). When items/products are placed on the conveyer belt by the customer, the conveyer belt is activated (i.e., started) so as to move the items toward the cashier or checkout clerk. The conveyer belt is then automatically stopped when a sensing device detects a break in a light beam from a light source, which occurs when a product on the conveyer belt enters (i.e., breaks) the light beam. It is noted that the light source and the sensing device are positioned within the checkstand such that the light beam is broken by products as the products reach the end of the conveyer belt. As the checkout clerk removes the product from the conveyer belt to check it out, the light beam generated by the light source again strikes the sensing device and, as a result, the conveyor belt is restarted, until the next product on the conveyer belt breaks the light beam. This process continues to repeat itself until all of the products have been removed from the conveyer belt.

U.S. Pat. No. 4,236,604, which is incorporated herein by reference in its entirety, discloses a known control system for use with conveyer belts and checkstands. In addition to the start/stop control mechanism discussed above, the system disclosed in the '604 patent also provided a time control mechanism for automatically stopping the conveyer belt if no product was detected by the sensing means for a predetermined time interval. The system of the '604 patent prevented the conveyer belt from continually running during periods of non-use, such as when there is no customer at the checkstand, thereby minimizing the wear and tear on the belt, and the costs associated with operating the belt.

Notwithstanding the foregoing advances in conveyer belt control systems, problems still remain. For example, in many instances, especially in retail stores, the objects or products being purchased, and therefore placed on the conveyer belt by the customer, are not opaque. Indeed, many of the products are translucent (i.e., allow for partial amounts of light to pass therethrough). When translucent products arrive at the end of the conveyer belt and enter into the light beam path of the photoelectric control system, the light beam is not totally blocked. In this situation, while the translucent object will diminish the intensity of the light reaching the photoelectric receiving device, the reduction in light received by the photosensor is not sufficient to reach a dark-state level or mode (i.e., the photosensor trip point) required to stop the belt from running. When this occurs, the belt continues to run and the translucent products are pushed or forced off the end of the belt. Many of these products are glass or plastic containers that frequently topple over on to the scanner, creating havoc for the checkout clerk. Some of the tall, round containers at times will roll off the checkstand and fall to the floor.

As one can easily conclude, such operation results in significant disadvantages. For example, there can be significant monetary loss due to product breakage. In addition, customer through-put at the checkstand can be significantly decreased due to the cashier spending time retrieving fallen items or performing clean-up for broken items, such as bottles. It is noted that the foregoing problem also occurs when low profile products are placed on the belt, as such low profile products may not prevent enough light from reaching the photosensor so that the photosensor detects a dark-state mode.

Currently, in order to avoid the foregoing problems, many checkout clerks resort to manually operating the power on/off switch of the conveyer belt in order to control the movement of the belt. However, this defeats the purpose of today's sophisticated checkstands which are equipped with photoelectric control systems in order to facilitate employee productivity by means of hands-off operation with regard to controlling the conveyer belt. In addition, the ergonomic advantage offered by positioning the invisible light beam path in a location that automatically stops the products within the proper reach of the checkout clerk is diminished. More specifically, when the checkout clerk controls the movement of the conveyer belt, once the belt is stopped the checkout clerk will begin reaching further up the belt to retrieve products rather than restarting the belt. Thus, when a checkout clerk avoids using the photoelectric control system to control movement of the belt, essentially all of the advantages provided by a photoelectric control system are lost.

Another problem with current checkstand systems concerns the light intensity of the light source utilized in the system. Typically, the intensity of the light emitted by the light source, which is utilized to start and stop the conveyor belt of the checkstand, is preset significantly above the light level required to turn on the conveyor. This is required such that, as contamination builds up on the lens of the photosensor, the light source intensity can penetrate through the contamination and keep the checkstand running. Another reason the intensity of the light source is set significantly above the trip point of the photosensor is that the light intensity emitted from the light emitting diode (LED) will diminish over a period of years. As the photoelectric control system of the checkstand is expected to provide uninterrupted service for a period of 10 to 15 years or more, to insure such uninterrupted operation, the light source intensity is typically preset to a level significantly above the level of the photoelectric sensor (also referred to herein as a photosensor) required to indicate a light state. As a result, as the intensity of the light source diminishes over time, the intensity level will still be sufficient to place the photosensor in the light state. It is a necessity that uninterrupted operation of the belt on the checkstand be accomplished without any manual adjustments to the control system. Unfortunately, however, increasing the intensity of the light source compounds the foregoing problem of the checkstand system not being able to detect translucent and low profile products.

Accordingly, in view of the foregoing problems, there is a significant need for a photoelectric control system for controlling the stopping and starting of a conveyer belt for use with a checkstand which consistently detects substantially all (i.e., most) translucent and low-profile products placed on the conveyer belt so as to prevent such products from being pushed off the belt onto the scanner (typically located at the end of the belt) or off the checkstand completely, so as to eliminate the problems concerning product loss, customer throughput, productivity of checkout clerks, etc., noted above, which are associated with today's photoelectric control systems currently utilized in checkstands.

SUMMARY OF THE INVENTION

In order to solve the foregoing problems, the present invention provides a self-calibrating photoelectric control system capable of detecting substantially all translucent and low-profile objects that only partially block the light beam of the photoelectric control system, thereby providing the ability to automatically start and stop the conveyer belt at the proper time regardless of the type of product being purchased. More specifically, the present invention relates to a method and apparatus for frequently and automatically calibrating/adjusting the intensity of the light source at specific predefined times to a point slightly above the light-state threshold of the receiver (i.e., the point that generates an output signal indicating light has been detected). By frequently calibrating the intensity of the light source to slightly above the light-state threshold (i.e., trip point) of the receiver, a minimal reduction in the light received by the receiver will result in the receiver transitioning to the dark-state mode (i.e., meaning that a product has been detected in the light path, and therefore the conveyer belt is stopped). As a result, when translucent or low profile objects/products enter the light beam, these products will cause a reduction in light received by the receiver which is sufficient to transition the receiver into the dark-state mode, and therefore stop the conveyer belt. Thus, the method and apparatus of the present invention results in substantially all translucent or low profile objects, which result in partial beam obstructions, being detected by the photoelectric control system.

More specifically, the present invention relates to a self-calibrating photoelectric control system including a light source for emitting a light beam having an intensity, a photoelectric sensor for receiving light from the light source and for generating an output signal when the received light is equal to or greater than a light-state threshold of the photoelectric sensor; and a calibration circuit for automatically calibrating the sensitivity of the photoelectric control system to partial beam breaks after occurrence of any one of a plurality of predefined events. In a first embodiment, the calibration circuit is operative for performing a calibration process which adjusts the intensity of the light beam emitted by the light source such that the intensity is slightly greater than the light-state threshold of the photoelectric sensor.

In addition, the present invention relates to the foregoing self-calibrating photoelectric control system for use in a checkstand to control the starting and stopping of a conveyer belt utilized to move products closer to a checkout clerk.

As explained in further detail below, the present invention provides numerous advantages over the prior art designs. First, and most importantly, the control system of the present invention provides for detection of substantially all products (e.g., translucent and low-profile) which result in only a partial beam deflection. Thus, because the present invention properly stops and starts the belt for substantially all products, the present invention minimizes monetary losses, due to, for example, broken products pushed off the checkstand, and down-time by the checkout clerk, which is also required if such breakage occurred.

By restoring confidence in the checkout clerk that the belt will function properly and stop the belt movement when any product reaches the end of the belt, the present invention allows for maximum customer throughput. In addition, the ergonomic advantages offered by the automatic conveyer belt system are fully realized by the present invention, as the checkstand clerk will no longer feel the need to manually over-ride the system in order to make sure products are not pushed off the end of the conveyer belt.

Another advantage of the present invention is that the calibration process is performed repeatedly during the course of normal operation of the checkstand such that the operation is frequently optimized under the given conditions. Moreover, the calibration is wholly automatic and does not require any action on behalf of the checkout clerk. Indeed, the calibration process is transparent to the checkout clerk, as the process is typically performed within a 100 msec time period, there is no perceivable delay in the operation of the belt. Furthermore, each time the calibration process is executed, the calibration process is completed prior to allowing the belt to be restarted.

Another advantage offered by the present invention is that when in the diagnostic mode of operation, the control system provides a simple effective way for maintenance personnel to determine if there is a defective light source or sensor. Indeed, this determination can be performed by depression of a single switch. Further, the technician can also confirm that the belt motor and belt are functional by depression of a single switch. Importantly, this switch is mounted on the housing of the control system so as to be readily accessible by maintenance personnel.

The foregoing and other features, aspects, and advantages of the present invention will become more apparent from the following detailed description of the present invention when taken in conjunction with the accompanying drawings.

BRIEF DESCRIPTION OF THE DRAWINGS

Preferred embodiments of the invention will now be described with reference to the accompanying drawings in which:

FIG. 9 illustrates a more detailed block diagram of the second embodiment of the present invention illustrated in FIG. 8.

DETAILED DESCRIPTION OF THE DRAWINGS

The invention will now be described as applied to automated checkout systems for use in retail stores, such as supermarkets, and general merchandise stores, such as Wal-Mart. However, it is noted that the present invention can be utilized in any photoelectric control system or application where detection of translucent and low-profile objects disposed among opaque objects is required.

Figure 1:
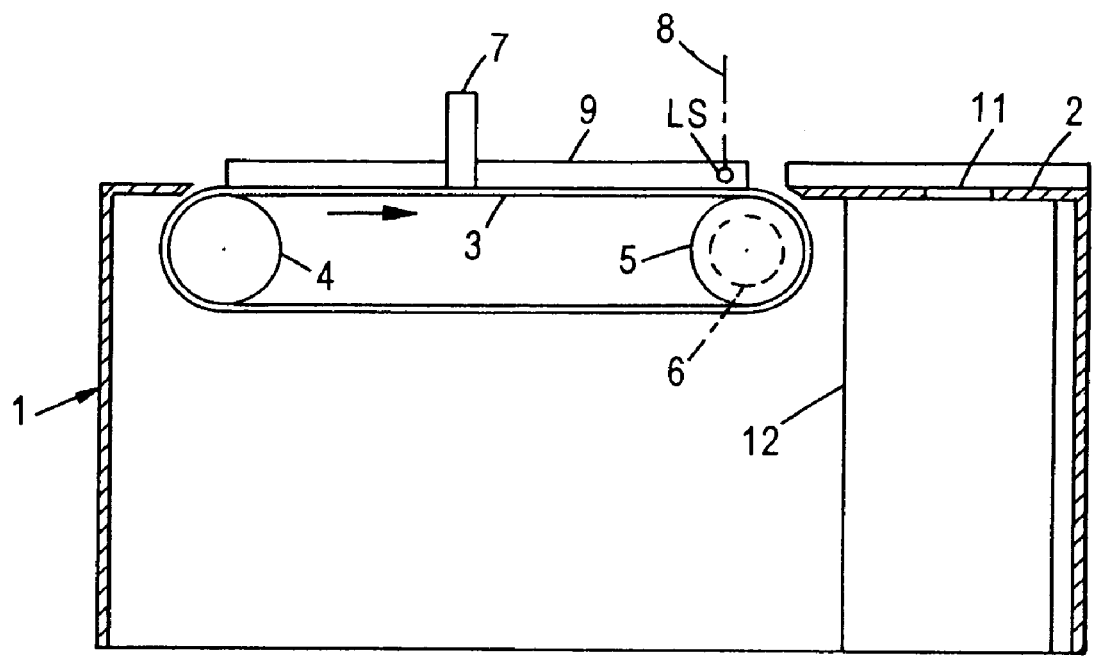
FIG. 1 is a front elevation of an automatic checkout stand with a conveyor belt included therein.
Figure 2:
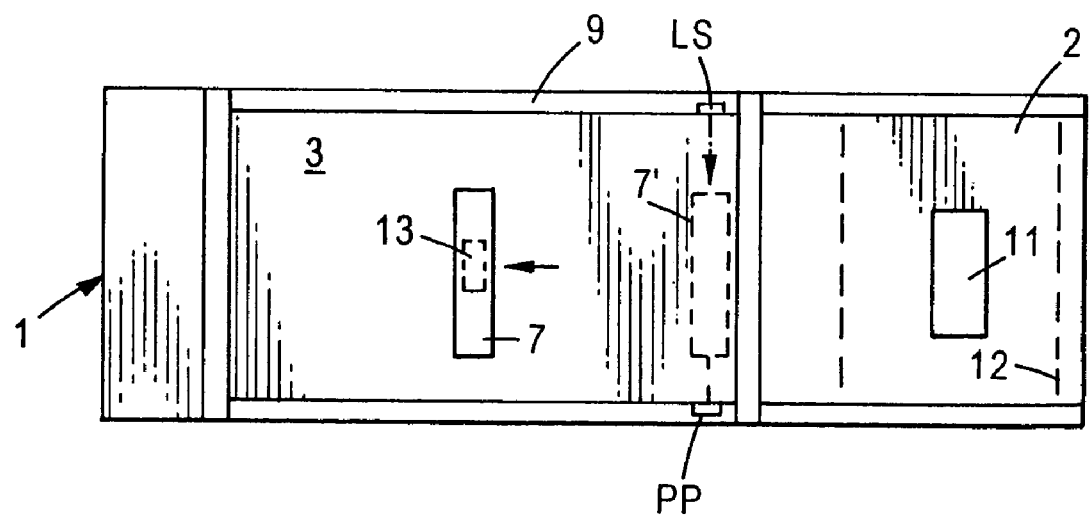
FIG. 2 is a top view of the checkstand and conveyor belt shown in FIG. 1.
Figure 3:
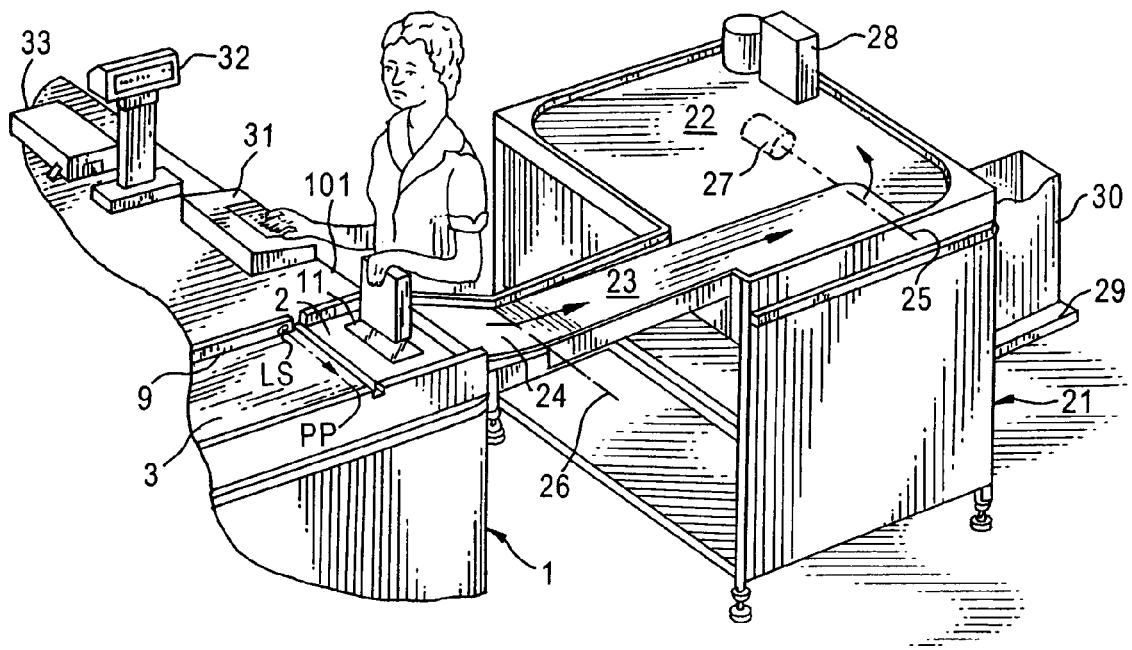
FIG. 3 is a perspective view of the checkstand with its associated equipment including the incoming conveyor belt and the figure also shows a packaging station and an outgoing conveyor belt interconnecting the checkout stand and the packaging station.

Prior to discussing the self-calibrating photoelectric control system of the present invention, a general description of an automatic checkout apparatus in which the present invention would be utilized is described with reference to FIGS. 1–5. In FIGS. 1–3 the checkout stand as a whole is designated as 1 and an incoming conveyor belt as 3. The belt functions to transport product items, such as package 7, which have been placed by the customer on the left end, FIGS. 1 and 2, of the belt to the right-hand terminating or delivery end of the belt which is marked by plane 8 in which the light source (LS) and the photosensor or receiver (PP) are disposed. Light source and receiver, which form part of the scanning equipment used in connection with the start/stop arrangement of the present invention may, for instance, be located in the two opposing side rails 9 between which the belt 3 moves.

As shown in FIG. 3, under normal conditions the light beam projected along the dot-dash line strikes the receiver/sensor. However, when product 7 arrives at the delivery end of the belt as indicated by the broken-line representation 7', see FIG. 2, the light beam is interrupted and this interruption is sensed by the receiver. In other words, prior to the product breaking the beam, the receiver is in the light-state as the amount of light being received is above the light-state threshold of the receiver. Once the product 7 breaks the beam, assuming the product is opaque, substantially no light is received by the receiver and the receiver enters the dark-state mode as the light being received is below the dark-state threshold of the receiver. As is known, in such systems once the receiver enters the dark-state the drive motor 6 of belt 3 is stopped such that the drive roller 5 of the belt and, along with it, belt 3 itself, as well as roller 4 at the other end of the belt, are stopped.

With belt 3 stopped, the checkout clerk lifts the product from the belt so as to scan the product, as shown in FIG. 3, and once the product is removed, the light beam from the light source again impinges on the receiver, thereby causing the receiver to enter the light-state which results in the re-activation of the belt. This process continues until the checkout clerk has removed and processed all items being purchased.

Figure 4:
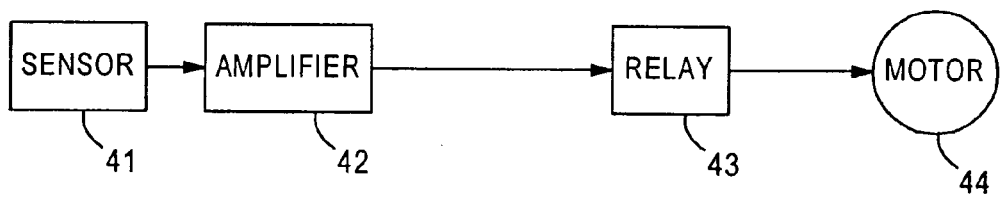
FIG. 4 is a simplified block diagram schematically showing the start/stop control for the conveyor motor according to the prior art.
Figure 5:
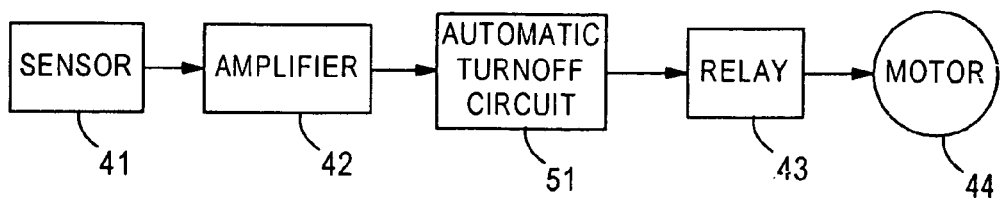
FIG. 5 is a simplified block diagram schematically showing the motor start/stop control with the inclusion of the automatic turnoff circuit according to the prior art.

FIG. 4 illustrates an exemplary block diagram illustrating the components utilized to control the belt movement. Referring to FIG. 4, a typical photoelectric control system as utilized in the prior art, consists of a photoelectric sensor (i.e., receiver) 41 which, by way of an amplifier 42, directly drives a relay 43 controlling the conveyor motor 44. FIG. 5 illustrates a block diagram of the photoelectric control system disclosed in U.S. Pat. No. 4,236,604, which provided for an automatic turnoff or "energy saver" circuit 51, which is interposed between the amplifier 42 and the relay 43 so that the amplifier drives the automatic turnoff circuit 51, and the automatic turnoff circuit in turn drives the motor control relay 43. As is known, the automatic turnoff circuit functions to stop operation of the belt in the event no product has been detected by the receiver 41 for a predetermined period of time.

Turning to the photoelectric control system of the present invention, as noted above, the system of the present invention provides for automatic self-calibration such that the intensity of the light source is automatically adjusted to a point slightly above the light-state threshold of the receiver. As described in further detail below, by frequently performing this self-calibration operation at various times during the operation of the system, the receiver transitions to a dark-state level upon minor reductions in the amount of received light, which allows the present system to detect substantially all translucent and low profile products placed on the belt.

Figure 6:
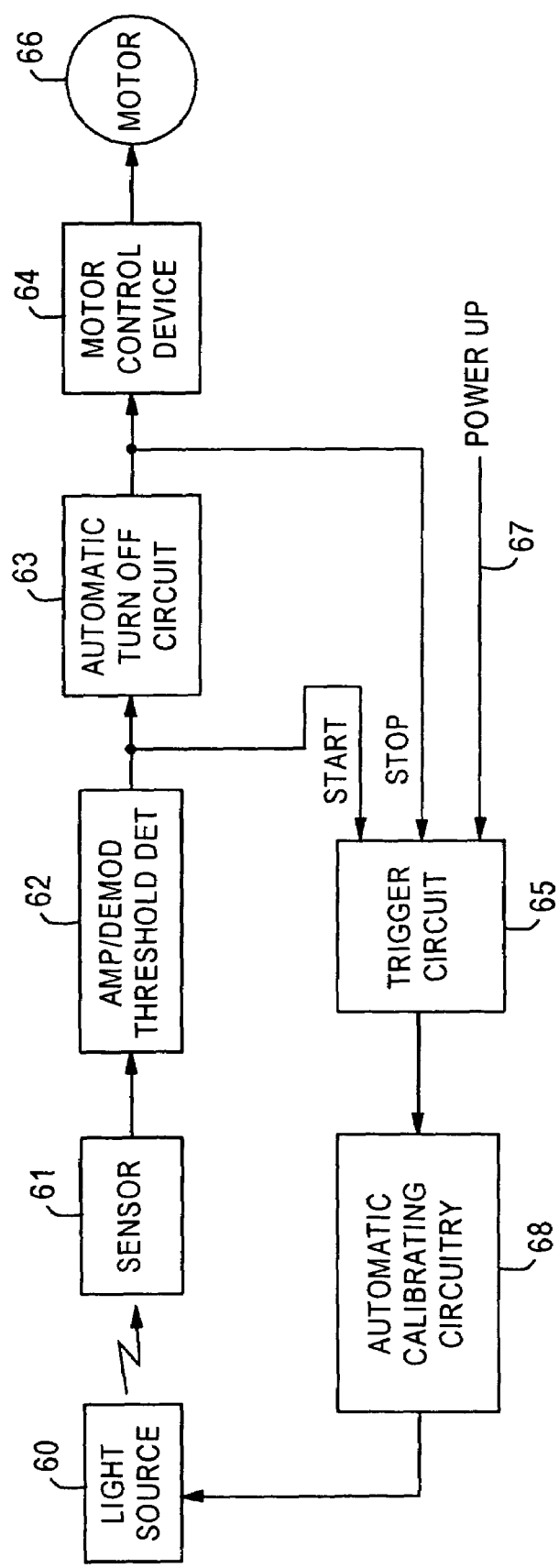
FIG. 6 illustrates an exemplary block diagram of a first embodiment of the self-calibrating photoelectric control system of the present invention.

FIG. 6 illustrates an exemplary block diagram of a first embodiment of the self-calibrating photoelectric control system of the present invention. Referring to FIG. 6, the system includes a light source 60, a photosensor or receiver 61, and amplifier/demodulator threshold detector circuit 62, an automatic turnoff circuit 63, a motor control device 64, a trigger circuit 65 and an automatic calibrating circuit 68. The operation of the system illustrated in FIG. 6 is as follows.

Specifically, the light source 60 and photosensor 61 are located in the same position and perform the same function as their counterparts in the prior art system discussed above. The output of the sensor 61 is coupled to the amplifier/demodulator threshold detector circuit 62. Detection circuit 62 function to determine whether the sensor 61 is in the dark-state mode (i.e., an object is in the beam path on the belt) or the light-state mode (i.e., no object is in the path and the sensor 61 is receiving light from the light source 60) and generate an output signal indicating the state of the sensor 61 (i.e., light-state or dark-state). The output of the amplifier/demodulator threshold detector circuit 62 is coupled to the automatic turnoff circuit 63 and the trigger circuit 65. The automatic turnoff circuit 63 functions in the same manner as the automatic turnoff circuit disclosed in U.S. Pat. No. 4,236,604, and as noted above, this circuit generates an output signal if the amplifier/demodulator threshold detector circuit 62 indicates that the sensor 61 has been continuously in the light-state for a predetermined period of time. The output of the automatic turnoff circuit 63 is coupled to the motor control device 64, which functions to detect the output signal generated by the automatic turnoff circuit 63 and disable the motor 66 and thereby stop the belt. The output of the automatic turnoff circuit 63 is also coupled to the trigger circuit 65.

The trigger circuit 65 functions as a control circuit for initiating the automatic calibration process of the present invention, which is described in detail below. As shown in FIG. 6, the trigger circuit receives input signals from the outputs of amplifier/demodulator threshold detector circuit 62 and the automatic turnoff circuit 63. In addition, the trigger circuit 65 receives an input signal 67, which indicates that the power control switch to the checkstand and the photoelectric control system has been activated. The output of the trigger circuit 65 is coupled to the automatic calibration circuit 68. In operation, the trigger circuit 65 essentially functions as an "OR" gate, and generates an output signal whenever any one of a number of predetermined initiation events (which are described below) occur, and this output signal, which is coupled to the automatic calibration circuit 68, functions to initiate the automatic self-calibration process of the present invention. It is noted that the initiation events identified below are deemed sufficient to guarantee that the sensor system is calibrated often enough so as to detect substantially all translucent and low profile objects placed on the belt system. Importantly, the initiation events are selected such that there is a high probability that the light beam will be uninterrupted (i.e., no product in beam path)

when the calibration is performed. However, clearly other or additional events, or a timed based function, could be utilized to determined when and how often the self-calibration process should be executed.

Upon receiving an output signal from the trigger circuit 65, the automatic calibration circuit 68 performs an automatic self-calibration routine. The self-calibration routine entails ramping up the light source from zero light (or any level which places the receiver in the dark-state mode) to a light intensity level which causes the sensor to transition from the dark-state mode to the light-state mode. In other words, the intensity is increased until the light-state threshold in reached. This transition/threshold point is detected by the amplifier/demodulator threshold detector circuit 62. Once the light-state threshold point is determined, the intensity of the light source is adjusted such that the intensity is raised a predetermined amount higher than the light-state threshold of the receiver, which was just determined by the calibration process. For example, in one embodiment, the intensity of the light source is increased by approximately 5% of the overall available intensity range above the light-state threshold of the receiver. However, it is also possible that the intensity of the light source could be set at a level other than 5% of the available intensity range. For example, in one embodiment, the optimal increase in the light intensity over the threshold could be determined based on the given application by performing an empirical analysis.

As noted above, by raising the light intensity of the light source only slightly above the light-state threshold of the receiver, minor reductions in received light will be judged to be a transition into the dark-state mode (i.e., an object breaking the beam path) and as a result, translucent and low-profile objects which only partially reduce the light received by the sensor can be detected by the system. Importantly, the execution of this self-calibration routine requires no intervention on behalf of the operator, and in fact, is transparent to the operator, as it is performed and completed within milliseconds of receipt of the initiation signal by the automatic calibration circuit 68. It is further noted that the light-state threshold of the receiver can vary during normal operation, for example, due to dirt accumulating on the lenses of the light source and receiver. By repeatedly performing the calibration process at selected times, the present invention optimizes the detection of objects that partially block the light beam, and thereby greatly enhances the system's ability to detect translucent and low-profile products.

Figure 7:
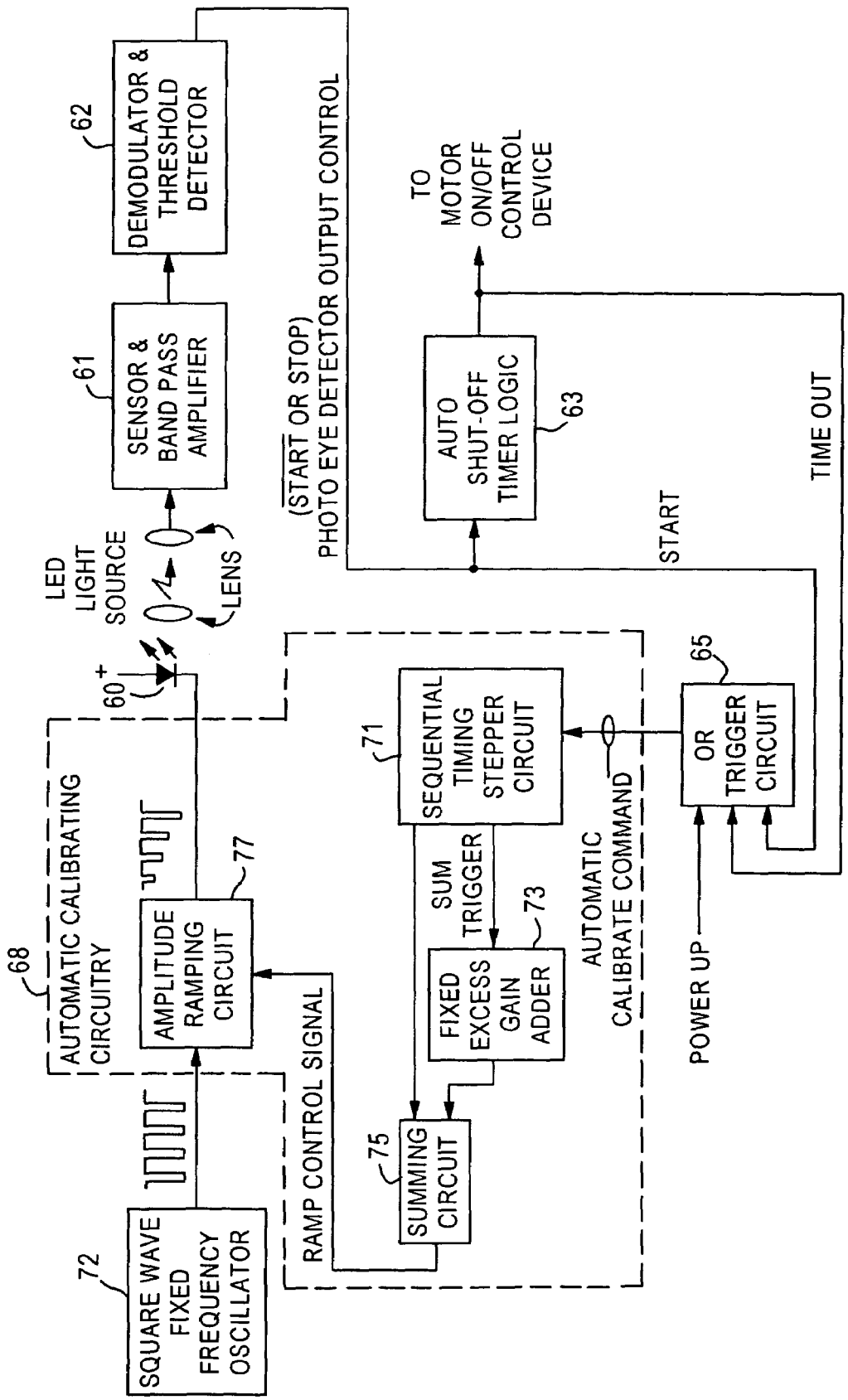
FIG. 7 illustrates a more detailed block diagram of an exemplary embodiment of the automatic calibration circuit shown in FIG. 6.

FIG. 7 illustrates a more detailed block diagram of an exemplary embodiment of the automatic calibration circuit 68 shown in FIG. 6. Referring to FIG. 7, the automatic calibration circuit of the given embodiment comprises a sequential timing stepper circuit 71, a fixed excess gain adder 73, a summing circuit 75 and an amplitude ramping circuit 77. The sequential timing stepper circuit 71 receives the output signal from the trigger circuit 65 as an input signal, which as stated above, operates as an automated calibration command. The sequential timing stepper circuit 71 generates two output signals, one of which is coupled to an input of the fixed excess gain adder circuit 73 and one which is coupled to an input of the summing circuit 75. The output of the summing circuit 75 is coupled to the amplitude ramping circuit 77. The amplitude ramping circuit 77 receives a pulsed modulated signal having a predetermined frequency, which is generated by a fixed frequency oscillator circuit 72, as an input signal. The output of the amplitude ramping circuit 77 is coupled to the light source 60 generating the beam transmitted across the belt. As is known, such pulsed modulated signals are typically utilized to drive the light source (e.g., LED) in checkstand photoelectric control systems. The amplitude ramping circuit 77 functions to adjust the amplitude of the input pulse modulated signal in accordance with the ramp control signal output by the summing circuit 75.

More specifically, as noted above, during the calibration process, the amplitude ramping circuit 77 functions to initially decrease the amplitude of the pulse signal output by oscillator 72 to a level which places the sensor/receiver in the dark-state mode (i.e., no output signal being generated by the photosensor 61), and then increase the amplitude of the signal provided to the light source 60, thereby increasing the intensity of the light emitted by the light source, until the sensor 61 enters the light state (i.e., sensor/detector generates an output signal). As noted above, once the light intensity necessary for transitioning the sensor into the light-state is determined, the intensity of the light source is set utilizing the sequential timing stepper circuit, the fixed excess gain adder and the amplitude ramping circuit at a predetermined level above the light-state threshold. It is noted that in the given embodiment the sensor 61 illustrated in FIG. 7 also includes a band-pass amplifier which allows for selection of only the light having the same frequency of the pulse signals output by the pulse generator 72, so as to prevent the sensor from inadvertently detecting ambient or random light (i.e., any light other than that output by the light source). The remaining components illustrated in FIG. 7 perform the same functions as the corresponding elements in FIG. 6.

In the given embodiment, the sequential timing stepper circuit 77, fixed excess gain adder circuit 73 and summing circuit 75 are essentially implemented in software within a processor. More specifically, in accordance with the given embodiment, the sequential timing stepper circuit 71 includes a register that counts from 2 to 254. The value in this register is then utilized to control the PWM (pulse width modulated) ramp control signal (output by the summing circuit 75) which is converted to a DC level by an RC network in the amplitude ramping circuit 77. Varying the duty cycle of the pulses forming the ramp control signal, based on the count in the register, causes the DC level in the amplitude ramping circuit 77 to vary which in turn controls the amplitude of the pulses to the light source 60. This allows the system to vary the light source by changing the pulse duty cycle, and thereby ramp-up the intensity of the light source during the calibration process.

When the automatic calibration command is received from the trigger circuit 65, the register in the sequential timing stepper circuit 71 is set to 2 causing the lowest duty cycle of the ramp control signal to be output to the amplitude ramping circuit 77. At this time, the summing circuit 75 is disabled (i.e., not adding additional counts), and the summing circuit 75 still passes the signal from the stepper circuit 71 to the ramping circuit 77 so the ramp control signal is under the control of the sequential timing stepper circuit 71. Upon receipt of the signal, the amplitude ramping circuit 77 converts the PWM signal to a DC level and decreases the negative pulses to a minimum, causing the light source to turn off (or at least be below the light-state threshold of the receiver. The sequential timing stepper circuit 71 also provides a delay so as to allow the detector to respond, before the system checks the detector output signal.

After this delay, the system checks the detector output signal. If the detector signal does not indicate a beam make (i.e., received light is below the light-state threshold of the receiver), additional counts (e.g., two counts) are added to the register in the sequential timing stepper circuit 71. This causes the ramp control signal's duty cycle to increase slightly. As a result, the amplitude ramping circuit 77 outputs a higher amplitude pulse to the light source (60) causing the intensity of the transmitted light to increase slightly. This cycle repeats until one of the following two events occur.

The first event is that the detector circuit 62 outputs a signal indicating it has received a beam make (i.e., the light received by the sensor 61 is above the light-state threshold of the detector 62). The second event is that the maximum register count for the register in the sequential timing stepper circuit 71 is reached (which indicates that the light source is at maximum intensity).

In the event a beam make output is received, the sequential timing stepper circuit 71 generates a sum trigger signal which is sent to the fixed excess gain adder circuit 73. The sum trigger signal contains the current count of the register in the sequential timing stepper circuit 71, which corresponded to an intensity sufficient to result in a beam make condition (i.e., over the light-state threshold). The fixed excess gain adder 73 contains a table indicating the number of counts to be added to the current count of the register so that the intensity of the light source is set higher than the light-state threshold by the desired amount (e.g., 5%). Accordingly, upon receiving the sum trigger signal, the fixed excess gain adder 73 provides the number of counts the register value is to be increased to the summing circuit 75. Upon receipt of this signal from the fixed excess gain adder 73, the summing circuit 75 adds this value to the current register value, and generates a new ramp control signal having a slightly higher duty cycle, which in turn causes the amplitude ramping circuit 77 to slightly increase the intensity of the light source 60. At this time, the calibration cycle is complete and the belt is started.

In the event the maximum count of the register of the sequential timing stepper circuit is reached before receiving a beam make signal from the detector, the register is left at the maximum count (254) causing the light source to be set to maximum intensity. This is a fail-safe setting.

It is further noted that in one embodiment of the present invention, the register contained in the sequential timing stepper circuit 71 has a working range of 2–254, and the table contained in the fixed excess gain adder 73 has eleven ranges, where:
Range 1=counts of 2–24.
Range 2=counts of 25 to 48.
Range 3=counts of 49–71.
Range 4=counts of 72 to 94.
Range 5=counts of 95–117.
Range 6=counts of 118 to 140.
Range 8=counts of 164 to 186.
Range 9=counts of 187–209.
Range 10=counts of 210 to 232.
Range 11=counts of 233–254.

If the beam make condition occurs with the register count in range 1, 2 or 3, the excess gain adder circuit 73 functions to add 10 counts to the register count, which corresponds to an excess gain value of 3.9% of the max. counts (i.e., 10 counts). If the beam make condition occurs with the register count in any of ranges 4–10, the excess gain adder circuit functions to add 16 counts to the register count, which corresponds to an excess gain value of 6.3% of the max. counts (i.e., 16 counts). It is noted that if a beam is made in the first three ranges, there is a very low number of counts in the register. This indicates an extremely sensitive light source or receiver, and therefore it is desirable to add less counts of excess gain. If the register count is 233 or more, the light source should be set to maximum intensity.

In the given embodiment of the present invention there are essentially three events that serve to trigger the performance of the self-calibration routine. The first event (i.e., event no. 1) is the activation of the checkstand's main power switch. Each time the power is applied to the control system, the system will perform the foregoing self-calibration process prior to starting the belt. It is noted that more often than not found, the sensor is in an uninterrupted light-state condition when the system is first powered-on. The second event (i.e., event no. 2) for initiating the calibration process is when the automatic shut off command is generated. As is known, the status of the light beam is guaranteed to be uninterrupted and in the light-state condition when the automatic shut-off command is generated by the automatic turn-off circuit 63. As it is desirable to execute the calibration process when the light beam is uninterrupted, the use of the generation of calibration command based on the generation of an automatic shut-off command guarantees optimal performance. The third event (i.e., event no. 3) for initiating the calibration process is the transition of the sensor from the dark-state mode to the light-state mode. In other words, during normal operation, each time an object which blocks the beam sufficiently such that the sensor is in the dark-state and the belt is stopped, when that product is removed from the belt and light is again received by the sensor sufficient to transition the sensor into the light-state, the calibration process is performed prior to re-starting the belt.

With regard to activation of the calibration process based on the first event, it is noted that if power is applied when the light beam path is completely interrupted by an object, the automatic calibration circuit 68 will function to set the intensity of the light emitted by the LED to maximum. As noted above, during calibration the intensity is increased until the sensor transitions into the light-state, however, if a product is providing a complete beam break, such as for an opaque product, the sensor will not enter the light-state, thus the LED is set to maximum intensity as a result of the calibration process. This LED setting would be undesireable as it would result in practicing the prior art systems. However, in accordance with the present invention, as soon as the next opaque product causes a beam break, and the product causing the beam break is removed from the belt (i.e., calibration event no. 3), the self-calibration process is performed again, thereby resetting the intensity level of the light source in the desired environment of an uninterrupted beam. Accordingly, even in the event that the initial calibration was performed with an opaque object in the beam path, after removing the opaque object from the belt, the calibration is re-performed thereby resetting the system to a more desired level. It is again noted, that upon occurrence of any of the events that trigger the calibration process, the calibration process is performed and completed before the belt is reactivated. This helps ensure that the calibration process will be performed in a state in which the beam incident on the photosensor is uninterrupted.

Similarly, in the event there is a partial beam break as a result of a transparent or low profile object within the light beam path when power is applied, the self-calibration system will operate to set the intensity of the light source to slightly above the intensity necessary for the sensor to be in the light state with the translucent object in the beam path. As a result, the belt will continue to operate until an object of slightly more opacity than the translucent object in the beam path during calibration advances into the beam path.

When a subsequent object is removed by the checkout clerk, this causes the self-calibration process to be re-executed.

In addition to providing for consistent detection of translucent and low-profile products which only partially block the light emitted from the light source, the circuitry utilized for performing the self-calibration process can also be utilized for performing diagnostic functions. More specifically, the self-calibrating photoelectric control system of the present invention allows for quick and easy determination of a defective light source or sensor, as well as a determination of whether or not the motor running the belt is functional.

Figure 8:
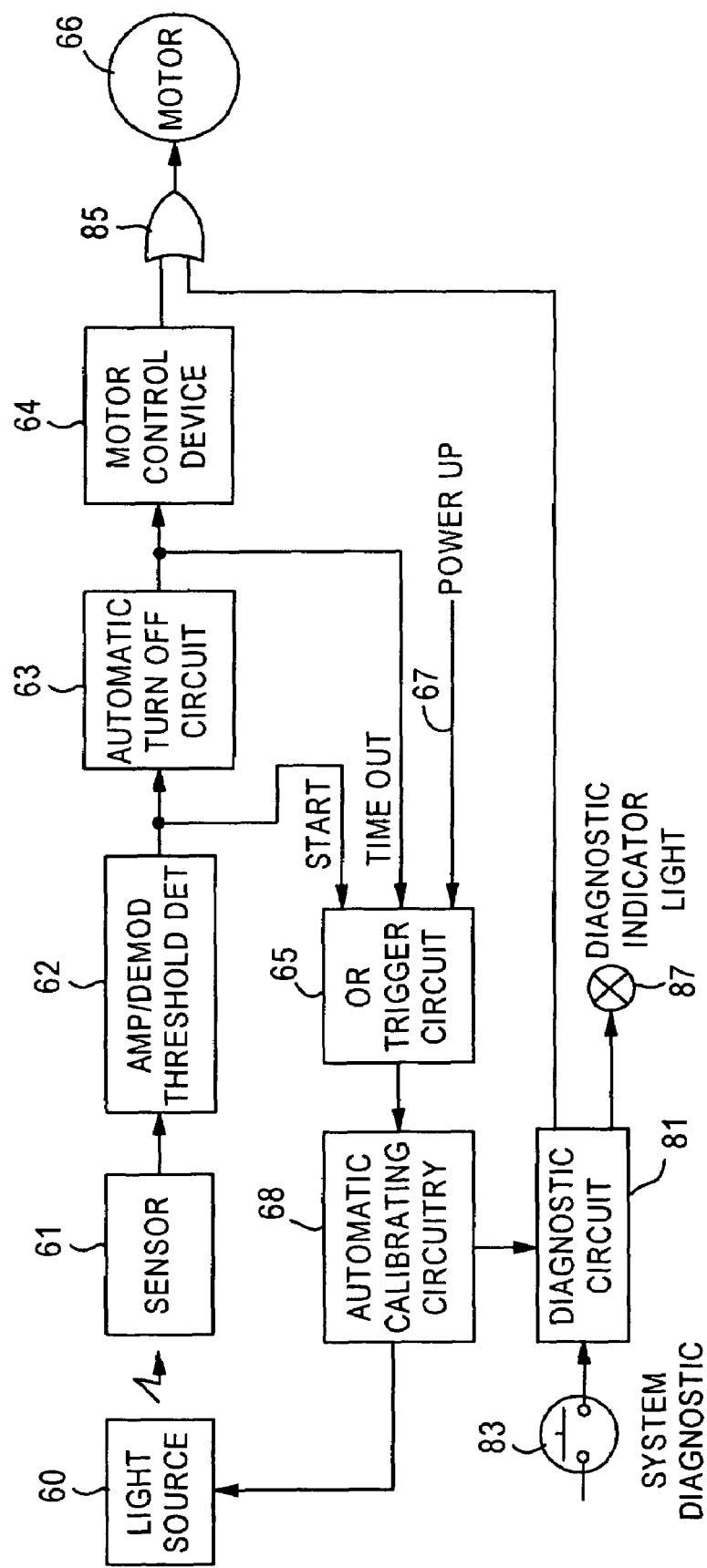
FIG. 8 illustrates a second embodiment of the self-calibrating photoelectric control system of the present invention which includes a diagnostic circuit.

FIG. 8 illustrates a second embodiment of the photoelectric control system of the present invention. As shown therein, the system includes all of the same components as the first embodiment and an additional diagnostic circuit 81, switch 83, OR gate 85 and LED 87. The diagnostic circuit 81 receives an input signal from the automatic calibration circuit 68 and an input signal from a switch 83, which serves, for example, to couple a high level logic signal to the diagnostic circuit. The diagnostic circuit 81 provides two output signals, one of which is coupled to OR gate 85, and one of which is coupled to the LED 87, which is designated as the diagnostic indicator light. The operation of the diagnostic circuit is as follows.

The diagnostic mode is entered when switch 83 is depressed. Upon depression of switch 83, the system first performs the automatic calibration processed described above. Upon completion of the calibration process, the system activates the belt for a fixed predetermined period of time (e.g., 2 minutes), and thereafter stops and returns to normal operation.

More specifically, if switch 83 is depressed, after completion of the calibration processes, the diagnostic circuit 81 operates to send an output signal (i.e., a logic high signal) to OR gate 85, thereby activating the motor 66, which causes the belt to rotate. The diagnostic circuit 81 has a timer circuit which maintains the output signal for a predetermined period of time (e.g., two minutes) for each toggle of switch 83. In other words, assuming for example that switch 83 was a push button switch, for each switch depression (after performing the calibration process) the motor and belt would operate for the predetermined period of time. This simple means of activating the belt allows the maintenance personnel to easily confirm the motor and belt are operable. It also allows for easy activation of the belt during, for example, a belt alignment process. In another configuration, the diagnostic circuitry can be such that the first time switch 83 is depressed the belt activates, and the subsequent time switch 83 is depressed the belt is stopped.

As noted above, depression/activation of switch 83 also results in the performance of the above-mentioned self-calibration process prior to the belt being activated. In other words, depression of switch 83 is an additional trigger event for the calibration process. As the beam path should be clear during the calibration process, if the light source and sensor are operating correctly, the sensor should transition to the light state well before reaching the maximum intensity value of the light source. In accordance with the present embodiment, during this calibration process, the intensity level output to the light source is monitored to determine if the intensity level equals or exceeds a predetermined maximum intensity level, which can be easily determined once the specific light source and sensor utilized in the given application are identified. If it is determined that the light source was raised to the maximum intensity during the calibration process, this indicates that the sensor did not enter into the light-state during the ramp-up process, and therefore either the light source or the sensor is likely defective (assuming there are no other obstructions in the beam path such as an inadvertently placed product or dirty lenses which are sufficiently dirty so as to prevent transition to the light-state). In the event this occurs, the diagnostic circuit 81 functions to illuminate the diagnostic indicator light, for example, by pulsing or flashing, which serves to notify the maintenance personnel that the maximum intensity setting was reached during calibration, and therefore there is likely a defective light source or sensor in the checkstand.

FIG. 9 illustrates a more detailed block diagram of the second embodiment of the present invention illustrated in FIG. 8. Referring to FIG. 9, as shown, the second embodiment includes a maximum level detector 91 which receives an output from the summing circuit 75, and which provides an output signal to the diagnostic circuit 81. As noted above, the maximum level detector 91 functions to monitor the output of the summing circuit 75 so as to determine if the maximum allowable intensity of the light source 60 has been reached, and if so, the maximum level detector 91 generates an output signal to the diagnostic circuit 81, which upon receipt of this output signal, pulses or flashes the diagnostic indicator light 87.

It is noted that the diagnostic indicator light 87 is also used to inform the maintenance personnel that the output device is on and therefore the belt should be running. In the given embodiment, the diagnostic indicator light 87 is a bi color (e.g., green and red) LED and has multiple functions. In normal operation, a green output indicates a beam break, and a red output indicates output on and motor should be running. In diagnostic mode, red flashing indicates the motor should be running but there is a problem with the light source, the receiver, or any of the cables connecting them to the system.

Finally, it is noted that photoelectric control sensor of the present invention is similar to the control module disclosed in U.S. Pat. No. 4,236,604 in that the control module of the present invention is also a plug-in type control system, wherein all of the control circuitry disclosed in the above embodiments are contained in a single module, which can be plugged into the checkstand. As such, control modules can be easily removed and replaced from the checkstand, which facilitates the ability of the maintenance personnel to determine whether or not the control module and/or the checkstand is functional.

While two exemplary embodiments of the present invention have been described above, numerous variations of the foregoing embodiments are clearly possible and are considered within the scope of the present invention. For example, in a first variation, while the foregoing embodiments disclose utilizing a separate light source and photoelectric sensor, it is also possible to utilize a retro-reflector sensor which contains both the light source and the photoelectric sensor in the same housing (i.e., same side of the checkstand). When utilizing such a retro-reflector sensor, the light emitted from the light source is directed across the conveyer to a prismatic reflector, which reflects the light back to the photoelectric sensor.

In another variation, as opposed to adjusting (i.e., increasing) the amplitude of the intensity of the light emitted by the light sensor during the calibration process, it is also possible to alter the light-state transition point of the sensor by reducing the trip point of the photosensor/receiver, or by adjusting the amplifier gain of the detector in the receiver. In such embodiments, the photosensor/receiver would have a variable light-state threshold, which is adjustable during operation, or a variable gain amplifier, which is adjustable during operation, respectively. As is known, the variable gain amplifier can be utilized to adjust the amplitude of the signal input into the detector, and as a result, adjust the transition point when the receiver will indicate beam make (i.e., receiver in light-state mode) for a given input intensity of light.

While detailed embodiments of components for implementing the self-calibrating photoelectric control system are disclosed herein, clearly other implementations are possible. Indeed, most of the control elements disclosed in the foregoing embodiments would typically be implemented in software and executed by a microprocessor, microcontroller or a dedicated ASIC. Furthermore, it is also possible that the necessary circuitry for implementing the present invention could be included within the photodetector device. However, it is also possible to implement the control system in hardware.

In yet another variation, while it is suggested in the foregoing embodiments to adjust the intensity of the light source above the light-state threshold of the photoelectric sensor by 5% of the available dynamic range during calibration, it is also possible to utilize another percentage.

As noted above, the present invention also provides numerous advantages over the prior art designs. First, and most importantly, the control system of the present invention provides for detection of substantially all products (e.g., translucent and low-profile) which result in only a partial beam reduction. Thus, because the present invention properly stops and starts the belt for substantially all products, the present invention minimizes monetary losses, due to, for example, broken products pushed off the checkstand, and down-time by the checkout clerk, which is also required if such breakage occurred.

By restoring confidence in the checkout clerk that the belt will function properly and stop the belt movement when any product reaches the end of the belt, the present invention allows for maximum customer throughput. In addition, the ergonomic advantages offered by the automatic conveyer belt system are fully realized by the present invention, as the checkstand clerk will no longer feel the need to manually over-ride the system in order to make sure products are not pushed off the end of the conveyer belt.

Another advantage of the present invention is that the calibration process is performed automatically and repeatedly during the course of normal operation of the belt such that the operation is optimized under the current/real time operating conditions. Moreover, the calibration is wholly automatic and does not require any action on behalf of the checkout clerk. Indeed, the calibration process is transparent to the checkout clerk, as the process is typically performed within a 100 msec time period, there is no perceivable delay in the operation of the belt.

Another advantage offered by the present invention is that when in the diagnostic mode of operation, the control system provides a simple effective way for maintenance personnel to determine if there is a defective light source or sensor. Indeed, this determination can be performed by depression of a single switch. Further, the technician can also confirm that the belt motor and belt are functional by depression of a single switch. Importantly, this switch is mounted on the housing of the control system so as to be readily accessible by maintenance personnel. Further, during initial assembly or repair of the checkstand, the diagnostic mode allows the belt to be run for a fixed time so that alignment adjustments can be made to the belt mechanism.

Although the present invention has been described and illustrated in detail, it is to be clearly understood that the same is by way of illustration and example only and is not to be taken by way of limitation, the scope of the present invention being limited only by the terms of the appended claims.

We claim:

1. A self-calibrating photoelectric control system for use in a checkstand, said system comprising:
   a light source for emitting a light beam having an intensity;
   a photoelectric sensor for receiving light from said light source and for generating an output signal when said received light is equal to or greater than a light-state threshold of said photoelectric sensor; and
   a calibration circuit for automatically calibrating the sensitivity of said photoelectric control system after occurrence of at least one of a plurality of predetermined events during operation of said checkstand, said calibration circuit operative for performing a calibration process which adjusts the intensity of the light beam emitted by the light source such that said intensity is greater than said light-state threshold of said photoelectric sensor,
   wherein said calibration comprises:
   reducing the intensity of the light source such that said photoelectric sensor is in a dark-state mode;
   increasing the intensity of said light source until said photoelectric sensor transitions into a light-state mode so as to determine the intensity of the light source which causes said photoelectric sensor to transition from said dark-state mode to said light-state mode; and
   adjusting the intensity of said light source such that the intensity is greater than the intensity of the light source which causes said photoelectric sensor to transition from said dark-state mode to said light-state mode.

2. The self-calibrating photoelectric control system of claim 1, wherein said intensity of said light source is adjusted so as to be only slightly greater than said light-state threshold of said photoelectric sensor.

3. The self-calibrating photoelectric control system of claim 1, wherein said intensity of said light source is adjusted so as to be only a predetermined amount greater than said light-state threshold of said photoelectric sensor.

4. The self-calibrating photoelectric control system of claim 3, wherein said predetermined amount is approximately 5% of the overall available intensity range of said light source.

5. The self-calibrating photoelectric control system of claim 1, wherein said predefined events include: (a) initial power activation to said self-calibrating photoelectric control system; and (b) a transition of said photoelectric sensor from a dark-state mode to a light-state mode.

6. The self-calibrating photoelectric control system of claim 1, further comprising an automatic shutoff element which is operative to generate an output signal when said photoelectric sensor remains in a light-state mode for a predetermined period of time.

7. The self-calibrating photoelectric control system of claim 6, wherein said predefined events include generation of an output signal by said automatic shutoff element.

8. The self-calibrating photoelectric control system of claim 1, further comprising a diagnostic circuit having a control switch which is externally accessible, said diagnostic circuit operative for initiating said calibration process upon activation of said control switch.

9. The self-calibrating photoelectric control system of claim 1, wherein during said calibration said intensity of said light source is increased in incremental steps.

10. The self-calibrating photoelectric control system of claim 1, wherein said checkstand includes a conveyor belt and said calibration is performed each instance said conveyor belt is started, said calibration being performed before activating the conveyor belt.

11. A method for operating a self-calibrating photoelectric control system comprising the steps of:
utilizing a light source for emitting a light beam having an intensity;
utilizing a photoelectric sensor for receiving light from said light source and for generating an output signal when said received light is equal to or greater than a light-state threshold of said photoelectric sensor; and
automatically calibrating the sensitivity of said photoelectric control system after occurrence of at least one of a plurality of predetermined events during operation of said checkstand, said calibration circuit operative for performing a calibration process which adjusts the intensity of the light beam emitted by the light source such that said intensity is greater than said light-state threshold of said photoelectric sensor,
wherein said calibration comprises:
reducing the intensity of the light source such that said photoelectric sensor is in a dark-state mode;
increasing the intensity of said light source until said photoelectric sensor transitions into a light-state mode so as to determine the intensity of the light source which causes said photoelectric sensor to transition from said dark-state mode to said light-state mode; and
adjusting the intensity of said light source such that the intensity is greater than the intensity of the light source which causes said photoelectric sensor to transition from said dark-state mode to said light-state mode.

12. The method of claim 11, wherein said intensity of said light source is adjusted so as to be only slightly greater than said light-state threshold of said photoelectric sensor.

13. The method of claim 11, wherein said intensity of said light source is adjusted so as to be only a predetermined amount greater than said light-state threshold of said photoelectric sensor.

14. The method of claim 13, wherein said predetermined amount is approximately 5% of the overall available intensity range of said light source.

15. The method of claim 11, wherein said predefined events include: (a) initial power activation to said self-calibrating photoelectric control system; and (b) a transition of said photoelectric sensor from a dark-state mode to a light-state mode.

16. The method of claim 11, further comprising an automatic shutoff element which is operative to generate an output signal when said photoelectric sensor remains in a light-state mode for a predetermined period of time.

17. The method of claim 16, wherein said predefined events include generation of an output signal by said automatic shutoff element.

18. The method of claim 11, wherein during said calibration said intensity of said light source is increased in incremental steps.

19. The method of claim 11, wherein said checkstand includes a conveyor belt and said calibration is performed each instance said conveyor belt is started, said calibration being performed before activating the conveyor belt.

20. A self-calibrating photoelectric control system for use in a checkstand, said self-calibrating photoelectric control system comprising:
a light source for emitting a light beam having an intensity;
a photoelectric sensor for receiving light from said light source and for generating an output signal when said received light is equal to or greater than a light-state threshold of said photoelectric sensor, said photoelectric sensor having a variable light-state threshold; and
a calibration circuit for automatically calibrating the sensitivity of said photoelectric control system after occurrence of at least one of a plurality of predetermined events during operation of said checkstand, said calibration circuit operative for performing a calibration process which adjusts the light-state threshold of the photoelectric sensor such that intensity of the light beam emitted by the light source is greater than said light-state threshold of said photoelectric sensor,
wherein said calibration comprises:
reducing the intensity of the light source such that said photoelectric sensor is in a dark-state mode;
increasing the intensity of said light source until said photoelectric sensor transitions into a light-state mode so as to determine the intensity of the light source which causes said photoelectric sensor to transition from said dark-state mode to said light-state mode; and
adjusting the intensity of said light source such that the intensity is greater than the intensity of the light source which causes said photoelectric sensor to transition from said dark-state mode to said light-state mode.

21. The self-calibrating photoelectric control system of claim 20, wherein during said calibration said intensity of said light source is increased in incremental steps.

22. The self-calibrating photoelectric control system of claim 20, wherein said checkstand includes a conveyor belt and said calibration is performed each instance said conveyor belt is started, said calibration being performed before activating the conveyor belt.

23. A self-calibrating photoelectric control system for use in a checkstand, said self-calibrating photoelectric control system comprising:
a light source for emitting a light beam having an intensity;
a photoelectric sensor for receiving light from said light source and for generating an output signal when said received light is equal to or greater than a light-state threshold of said photoelectric sensor, said photoelectric sensor comprising an amplifier having a variable gain; and
a calibration circuit for automatically calibrating the sensitivity of said photoelectric control system after occurrence of at least one of a plurality of predetermined events during operation of said checkstand, said calibration circuit operative for performing a calibration process which adjusts the gain of said amplifier in said photoelectric sensor such that intensity of the light beam emitted by the light source is greater than said light-state threshold of said photoelectric sensor,
wherein said calibration comprises:
reducing the intensity of the light source such that said photoelectric sensor is in a dark-state mode;
increasing the intensity of said light source until said photoelectric sensor transitions into a light-state mode so as to determine the intensity of the light source which causes said photoelectric sensor to transition from said dark-state mode to said light-state mode; and
adjusting the intensity of said light source such that the intensity is greater than the intensity of the light source which causes said photoelectric sensor to transition from said dark-state mode to said light-state mode.

24. The self-calibrating photoelectric control system of claim 23, wherein during said calibration said intensity of said light source is increased in incremental steps.

25. The self-calibrating photoelectric control system of claim 23, wherein said checkstand includes a conveyor belt and said calibration is performed each instance said conveyor belt is started, said calibration being performed before activating the conveyor belt.

* * * * *